Patented July 28, 1936

2,048,719

UNITED STATES PATENT OFFICE 2,048,719

ART OF FIBER LIBERATION AND IN FIBRILIZED PRODUCTS THEREOF

Arley C. Whitford, Alfred, N. Y., assignor to J. Weston Allen and Everett E. Kent, both of Newton, Mass., and Henry W. Packer, Wellesley, Mass.

No Drawing. Application June 29, 1932, Serial No. 620,055. Renewed October 21, 1935

7 Claims. (Cl. 92—15)

This invention relates to improvements in the art of fiber liberation and in fibrilized products thereof.

More particularly the invention involves the treating of "fiber" with a liquid composition which, by reacting chemically with certain parts of the fiber, and by avoiding reaction with certain other parts, makes at low cost a fibrilized product having new or greatly improved properties.

The invention deals with the mutual relations of ultimate cells of the fiber; and it provides for their selective and limited separation, viz, separating certain ultimate cells from certain other ultimate cells which lie adhesively at microscopic distances beside them; and it provides for the doing of this without injury to either of the said separated cells, and without breaking or weakening the endwise adhesions of such cells. The successful achievement of this selective control has brought with it the promise of great benefit to industry and the arts.

The treatment is herein described with reference to what are known to commerce as long vegetable fibers. And it relates more especially to those in which the cementitious matter joining laterally the ultimate cells has a substantial ligneous content.

The invention is supplemental to one which is disclosed and claimed by Joseph H. Estes of Miami, Florida, in an application for patent filed simultaneously herewith, Serial No. 620,054 and having the same title as this, which appears applicable with benefit to all bast and leaf fibers, and has also been applied with advantage to some other kinds of plant fiber, and which is helpful with all, but in certain kinds does not sufficiently remove the cementitious material. The present invention supplies that deficiency.

Preferably the invention is applied to the "fiber" after any customary or suitable retting or decorticating process; that is, after the cortex and woody portions of the stalks, or the pulp in case of leaf fiber, have been removed.

In "fiber" seen at this stage, or after the further processes practiced to prepare it for spinning, that which the eye observes as a typical one of the separate filaments, however small, is nevertheless an aggregate of smaller filamental elements (fibrils) whose individual identity is practically lost in the snugness and tightness of their parallel nesting together. Each fibril consists of a succession of elemental tubular cells joined end to end with intervening strong cementitious filling matter between them. The mass of such fibrils which thus coheres as a filamentary unit is commonly called "a fiber."

In the plant the fibrils grow in these cemented-togther groups, called bundles. Each "fiber" produced by the retting process may contain one or several of these bundles, which each in turn may contain few or many fibrils. The tubular fibril cells are of microscopic diameter, but may have substantial length or may be very short. The invention provides for removing cementitious matter which intervenes laterally in the microscopic interstices between cells, thus freeing the fibrils from each other, without at the same time weakening the endwise cementitious connections of the cells; and without chemically degrading the tubular walls of the cells; thus leaving the freed fibrils individually intact and strong.

This selective erosion of intercellular matter produces a sort of chemical catamorphism, throughout a mass or batch of fibers of convenient size for economical industrial handling, such that each "fiber" becomes split or sub-divided. As the action is progressive the fineness of splitting can be controlled, to a degree; but if carried to the end it constitutes a sub-dividing of the fibers into individual strings of single connected cells (fibrils),— or even into single long cells in the case of ramie or other plants having cells of comparable extreme length. Also the product from the original heterogeneous material may contain, in some instances, cells of other variety than that above described, e. g. cells which are not ordinarily in a strict sense considered to be part of a fibril, although the string be comparable to one or a small number of fibrils in diameter. I therefore call the invention a fibrilizing process.

The improvement made by Mr. Estes involves the excluding of caustic and other strong alkali from the treatment; the excluding of acid; the making of a colloid which is so perfectly a hydrophilic colloid that it can penetrate fully the microscopic interstices and thus thoroughly can wet the heterogeneous materials that make up the "fiber", and is of such composition that it can serve as a protective colloid for a selected portion of the fiber; the making of an alkali reactive solution whose notable and essential characteristic is that its alkali is extremely weak, within limits. My present invention supplements this, for certain kinds of fibers, by providing in the solution a sodium sulfite characteristic, which removes by chemical erosion material which is ligneous in composition, and which appears to be not affected by the above treatment, while selectively avoiding the eroding of the endwise connections of the cell and the eroding or degrading of the cellulose of the cells.

In both cases the careful control of the condition and duration of application of solution to the fiber are requisite according to certain principles hereinafter set forth.

The procedure of the invention is to attack the middle lamella, between cells laterally in a fiber bundle, with a weak alkali capable of removing it by solution and/or chemical attack; while retarding the chemical attack on the cell wall, and while avoiding the use of chemicals which might attack the material constituting the endwise juncture between cells. As the effects must be gained by penetration by the protecting material along with the attacking material into spaces of extremely small dimensions, a first requisite is the making of a colloid whose continuous phase (in this case water) will be perfectly adsorbed on interstitial surfaces and which is so perfect a colloid that its dispersed phase (in this case a neutral soap) will follow in for giving the desired protection.

For the making of such a hydrophilic colloid Mr. Estes found it, and I have confirmed that it is, satisfactory to put finely divided well dried neutral soap into water which is boiling. The boiling water has a temperature and a concomitant agitation which will assure the making of a hydrophilic dispersion if the quantity of soap put in be of a proportion ranging between .2 and .5 of one per cent of the quantity of water. With a percentage of soap higher than 1% there is probability of making a hydrophobic mixture or, at any rate, a mixture which does not penetrate among fibrils completely and operate uniformly. With less than the proportion stated, the desired colloidal state may not arise. If the soap be put into cold water which is later heated there is also danger of missing the desired result, because the soap may become hydrolized. But the making of a hydrophilic colloid as stated evidently carries the soap thoroughly into the interstices between fibrils, as openings between them become available during the treatment, and protects the cells from the attack of the alkali of the solution.

For the alkali it is preferred to use sodium carbonate in the weak hydrated form called sal soda wherein each molecule is associated with ten molecules of water. This or the other alkalies mentioned herein later, and the sulphite, are to be ground fine and put into the boiling water.

Preferably the soap and the alkali and sulfite should be ground and mixed preliminarily, to be put into the water together, for experiment has shown that the process worked less well when the chemicals are not pre-mixed.

When the crystalline sodium carbonate is used the following proportions serve:

|  | Percent |
| --- | --- |
| Neutral soap, well dried | .2 to .5 |
| Sal soda | .5 to 1 |
| Sodium sulphite | .2 to .75 |

These are to be preliminarily ground and mixed together and then put into boiling water 100%.

The kinds of plants whose fiber is particularly susceptible to treatment by the present invention include manila, New Zealand flax, lowest grade sisal (butts and aged stock) cabuya, Colorado River hemp, and other plants in which the cementitious material which stands laterally of the ultimate cells in a fiber bundle has a ligneous component of substantial percentage. I have found that varieties of plant fiber on which the Estes process above described was not successful are distinguished from those on which it is successful by the having of this ligneous component which does not yield to the weak alkali solution which characterizes the Estes process. And I have found that notwithstanding the dangers of affecting the endwise junctures between cells by the introduction of stronger reaction, or of affecting the cellulose, it is possible to erode this ligneous component and to leave the cellulose and its pectic neighboring bodies which intervene between cells endwise safe and strong in their connections and original constitution by the introduction of a small quantity of sodium sulfite, $Na_2SO_3$. The plants named above whose fibers yield to this have very strong fibers which, so far as I am aware, have never heretofore been made available on a commercial scale for fine spinning, because of inability to make the sub-division—although it has been much desired to find a means to utilize them and others of their kind.

A convenient quantity of the retted or decorticated fiber to be subjected to treatment in a batch together amounts to about 5 or 10% by weight of the water into which it is to be put. Uniformity of result in the mass of treated fiber is a point of great commercial importance, and this is attainable if the proportion treated at a time be kept thus small, the liquor be boiling when the fiber is put into it, and be boiled vigorously and continuously in an open vessel, thus treating the fiber for about a half hour. Boiling in a kier or a closed vessel is to be avoided, as not providing a desired access of atmospheric oxygen. If an oxidizing agent be added in a closed vessel the results are likely to be not uniform.

The fiber is to be removed from the boiling liquid when it can be ascertained, by rubbing a sample between the fingers, that its initial harsh feeling has changed to a slimy, slippery, soft and silky feeling. Over a wide range of fibers I have found that the proper duration of boiling ranges between 25 and 45 minutes; and that the stated half hour is about right for most fibers.

Upon removal from the liquor the fiber is to be rinsed, drained and dried.

If treated with acid the product will be weakened, or even broken into short lengths.

Weakening may also result from having alkali too strong in the liquor. And, if treated too long by the specified proper liquor, the fiber will lose in strength, which is due presumably to progress by the alkali in converting cellulose of the cells to oxycellulose which is brittle. This converting reaction is retarded by the quality of the protective colloid which draws it to the surfaces of the cell, and thoroughly wets those surfaces, and adsorbs the protective film of neutral soap strongly thereon. Coupled with this are the concomitant weakness of the attack of the alkali on the cellulose, because of the low alkali concentration; and the constant progress meanwhile, during this retardation, of the business of removing the alkali-soluble pectic bodies. As the chemical reaction with and/or solution of these pectic bodies progresses, parts of the middle lamellae disappear, and thus the firm lateral junctures between cells diminish. Progressively the ultimate fibrils come to be only weakly connected to each other, a state in which they may later become separated by mechanical rubbing; and progressively entire separations occur as the action of the liquor continues. Separations first occur by breakages through weaker places in the midst of a fiber bundle, leaving the bundle in split fragments. If the treatment be continued long enough, every fibril will come apart from every other. And then, by a further continuance of the treatment, there follow other results to the individual fibrils, as mentioned hereinafter.

The fineness of sub-divisions may be controlled selectively by selecting the time for discontinuing the treatment; stopping it, for instance, a little early, or a little late, to get respectively a coarser or a finer sub-division of fibril bundles, or continuing it still longer to get sub-division into individual fibrils. But in each case the retention by the cells of their native tensile strength, and their endwise connections, leaves them workable as long filaments (fibrils). These retentions of length and strength are important features which distinguish the product of the present invention.

The explanation underlying this important feature is, I believe, that some among the numerous kinds of pectic bodies, which are present in plant stalk and leaf fibers, are soluble in acid, and some in alkali. It is known however that wood fiber can be broken into elements short enough for making paper by either acid alone or by soda alone. Alkali attacks cellulose, converting it to oxycellulose by adding oxygen; and the tubular walls of the ultimate cells consist of cellulose of microscopic thickness. However, it happens that those pectic cementitious bodies which stand laterally between the fiber cells are the ones capable of being taken into solution by the treatment with very weak alkali above described; while those pectic cementitious bodies which connect the ultimate cells endwise resist alkali. They yield to acid. But because caustic alkali is excluded from the formula provided by the invention; and strong concentrations of soda ash are excluded; and also acid is excluded; and the penetrative protective colloid is provided;—under these conditions the composition is capable of completing its work of dissolving the pectic middle lamella before damaging effect upon the cellulose has become appreciable.

The selectivity of action is especially important in dealing with kinds of fibers which have not hitherto been sub-divisible without sacrifice of strength, because some of such are inherently much longer and stronger and are at the same time less costly than the kinds of fiber commonly used.

If the formula be varied by using the sodium carbonate in the form of the monohydrate $Na_2CO_3.H_2O$, its percentage relative to the water would be in the vicinity of .3 to .8% of the water; or, if used in the anhydrous form of soda ash $Na_2CO_3$, the range of about .2 to .7% of the water into which it is put would be equivalent to the preferred formula.

The desirability of excluding caustic alkali having been explained above, in order to avoid having such character or strength of alkali as will appreciably attack the cellulose, it remains to mention two exceptions; first, that such infinitesimal degree (if any) of hydrolysis as occurs incidentally upon the putting of sodium carbonate into aqueous solution has no appreciable effect, and may be treated as a nonentity. Second, a weak concentration of sodium hydroxide may be safely employed to provide the desired alkalinity, if this be in conjunction with the sodium sulfite, because the latter acts as a retarding agent, and in effect renders nugatory the potential attack of the caustic on the cellulose. In that case the sodium hydroxide NaOH may be taken within the range of .1 to .5% and sodium sulphite $Na_2SO_3$ within about the range of .2 to 1.%. Being ground and mixed together and put into 100% of boiling water, a sufficient alkalinity is present for dissolving the lateral pectic bodies, and sulphite for dissolving the ligneous bodies, without affecting the endwise cementitious matter of cells. But the tendency of the sodium hydroxide to degrade the cellulose into oxycellulose is restrained because the sodium sulphite, acting as a reducing agent, seizes upon a large part of whatever oxygen is found in the liquid and so preempts it from use in a reaction with the cellulose.

The sodium sulphite has its best effect of separating cells laterally when used in conjunction with weak alkali as herein set forth. This has the notable industrial benefit that it renders available, for fine spinning, the fibers of various kinds of plants which are known to have especial merits but have not been thus available before. Obstacles have been the extreme difficulty and high cost of getting them finely divided, if indeed this has been possible at all except by the use of alkali in such strength as has disintegrated or too much weakened the product.

It has followed that the known great strength of some of these tropical fibers can be retained in the sub-divided fiber and utilized in various ways industrially in small sizes of spun threads, for which only the weaker fibers have hitherto been available, and with new qualities of softness, absorbence, flexibility, etc. in the fibers and products thus newly made available.

The treatment may be stopped when the described stage has been reached as between some but not all of the fibrils of a bundle. The fiber bundle will then be fractioned into smaller groups of fibrils; and for some industrial uses this will be sufficient and be even better than the extreme sub-division which is obtainable by continuing the treatment till all individual fibrils are separated.

Such partial success as may have been hitherto attained in splitting bundles, whether by long continued bio-chemical decay, in the retting, or by treatment in boiling solutions of alkali and/or acid, or by bruising, has been always, I believe, accompanied by injury to and deterioration of the fibrous product, and has resulted in the weakening of the cellulose cells, or their endwise junctures.

The fibrilized product of the present invention is distinguished from all such by its cells being of their original strong quality of cellulose, their endwise junctures unaffected, and their physical structure unimpaired by crushing, maceration or breakage.

The surfaces of cleavage left on the elements separated by the invention will be, in some cases, the pure cellulose surfaces of the individual cells in the fibrils. If the eroding treatment be carried less far, the cell surfaces may retain some of their surrounding cementitious lamellae; or indeed the process may have been stopped when the original bundle, splitting first at its thinner or weaker places, had as yet separated only into group fragments, each containing several fibrils. In either event the product is spinnable into finer threads than while the original bundles remained undivided. And in either case the distinction is noted, over such fibers as flax, for example, where reduction of the retted product is executed by various methods of bruising and fracture, that the unitary filament produced by the present invention has its cells and connections substantially whole in longitudinal extent, with separation and surface made gently by restricted erosion; and that the mass contents are homogeneous in form.

By this use of the sodium sulfite ingredient the benefits of the Estes process are extended to plant fibers on which it is only partially but not satisfactorily effected. Although a type of plant to which especial reference has been made has long clear fiber, whose fiber bundles are already recognized and used as fibers, the utility of the invention is not limited to such. For example, there are other plants whose stalks are interrupted at short intervals by knobs or joints or growths not easily removable. But in suitable cases where these bunches are of ligneous matter they may be removed by the process of the invention, so that the continuity of cellulosic cells and their junctures, constituting fibrils, extending past where the hard spots were, become separated and usable, either as fibrils, fragments of bundles, or even for the first time as whole fiber bundles.

Deformation of the fibrilized product by the introduction of a quality comparable to the kink of wool may be obtained by continuing the treatment in the boiling liquid for ten minutes or so after the stage of separation and fibrilization has been reached, which is indicated by the slimy feel. This makes the fiber useful for textile purposes in fine and flexible threads, and with the other qualities which characterize the fibrilized product.

I claim as my invention:

1. A process for catamorphosis of plant fibers containing ligneous cementitious lamellae around the ultimate cells, comprising the immersing of the fiber in a mild alkali solution containing sodium sulfite, and boiling in open air until a splitting of the fiber-bundles occurs; said solution being one which is relatively inert to and therefore not erosive of the material of the walls of the ultimate cells, and likewise inert to the material of their longitudinal cementitious connections.

2. A process for catamorphosis of plant fibers, comprising the treatment thereof with mild alkali including sodium sulfite in the presence of an hydrophilic colloidal dispersion of neutral soap, whereby alkali soluble pectic bodies are removed while acid soluble pectic bodies and normal cellulose remain unaffected.

3. A process for catamorphosis of plant fibers, comprising the treating of a mass of fibers with a mild alkali solution under conditions of heat and agitation, sodium sulfite being present in the solution, whereby alkali soluble pectic bodies and sulfite reactive lignin bodies are removed; and continuing said treatment to, and arresting it at, the stage of slimy feel of fiber at which stage a fibrilizing separating into fragments of fiber-bundles occurs.

4. A process for liberation of plant fibrils comprising the treating of a mass of fiber-bundles in a solution, in which solution to 100% of water there are about .2 to .5% (two-tenths to five-tenths of one per cent) of neutral soap and .5% (five-tenths of one per cent) of sodium carbonate, and about .5% (five-tenths of one per cent) of sodium sulfite, the said treatment continuing with erosion of lateral cementitious connection between cells in the fiber until separation of fibers into fibrilized fragments occurs.

5. A process for liberation of plant fibrils comprising the treating of a mass of natural fiber-bundles in a boiling aqueous solution, comprising an hydrophilic colloidal dispersion of neutral soap in which there is approximately about .5% (five-tenths of one per cent) of sodium carbonate, and .5% (five-tenths of one per cent) of sodium sulfite, said treatment continuing until lateral cementitious connections between ultimate cells are eroded sufficiently for the bundles to split into fragments.

6. A process for liberation of plant fibrils comprising the treating of a mass of natural fiber-bundles in a boiling aqueous solution, comprising an hydrophilic colloidal dispersion of neutral soap in which there is sodium sulfite within about the range of .2 to 1% (two-tenths of one per cent to one per cent) and sodium hydroxide within the range of .1 to .5% (one-tenth to five-tenths of one per cent), said treatment continuing until lateral cementitious connections between ultimate cells are eroded sufficiently for the bundles to split into fragments.

7. A process for catamorphosis of plant fibers, by the eroding of alkali-soluble content thereof intervening laterally between bodies of normal cellulose thereof, comprising the treatment of those fibers with mild alkali including sodium sulfite in the presence of an hydrophilic dispersion of a substance to which the cellulose of the fiber cells is both chemically inert and preferentially adsorptive, of which neutral soap is an example, whereby the normal cellulose and the acid-soluble pectic bodies remain unaffected, for a temporary period while said alkali-soluble content is being taken into solution.

ARLEY C. WHITFORD.